Figure 1:
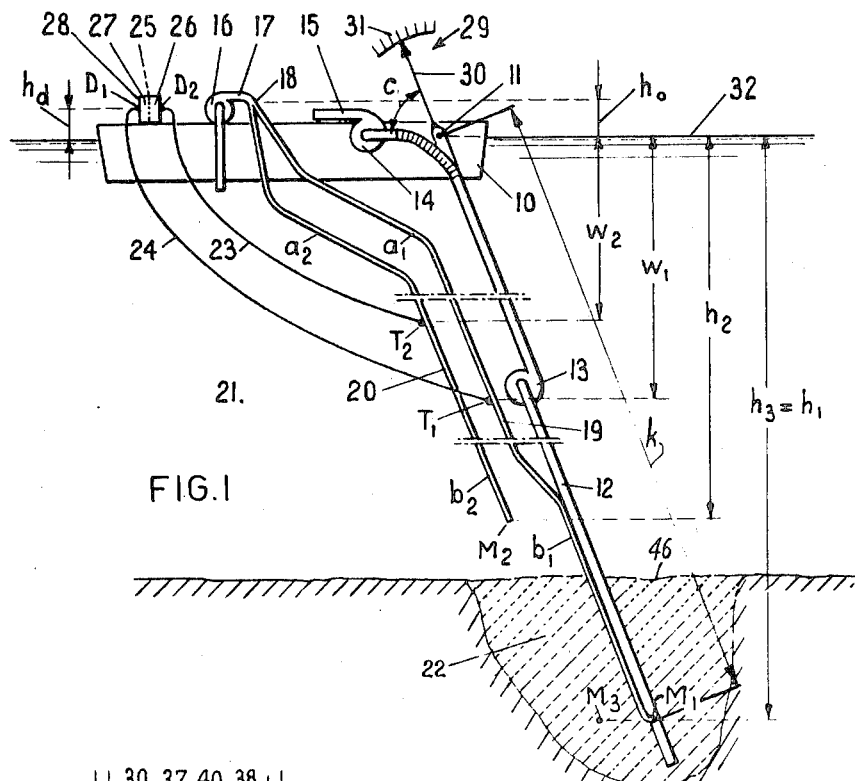

United States Patent

[11] 3,628,263

| [72] | Inventor | Romke van der Veen<br>Jutphaas, Netherlands |
|---|---|---|
| [21] | Appl. No. | 838,712 |
| [22] | Filed | July 2, 1969 |
| [45] | Patented | Dec. 21, 1971 |
| [73] | Assignee | N. V. Ingenieursbureau Voor Systemen en Octrooien "Spanstaal"<br>Rotterdam, Netherlands |
| [32] | Priority | July 15, 1968 |
| [33] | | Netherlands |
| [31] | | 68.09986 |

[54] PRESSURE DIFFERENTIAL MEASURING MEANS FOR SUCTION DREDGING INSTRUMENTS
4 Claims, 2 Drawing Figs.

[52] U.S. Cl. .................................................. 37/58,
73/407 R, 73/438, 137/92, 417/19
[51] Int. Cl. ........................................................ E02f 3/88
[50] Field of Search............................................ 137/4, 7,
12, 92, 467.5; 417/19, 280, 282, 307, 309; 37/58,
62, 61; 73/438, 439, 407

[56] References Cited
UNITED STATES PATENTS

| 1,834,333 | 12/1931 | Church................ | 37/58 UX |
| 2,019,968 | 11/1935 | Holloway.............. | 37/62 |
| 2,394,549 | 2/1946 | Howe.................... | 73/439 |
| 2,572,263 | 10/1951 | Hofer.................... | 37/58 UX |
| 2,707,964 | 5/1955 | Monroe................ | 137/4 |
| 2,718,717 | 9/1955 | Collins.................. | 37/61 |
| 2,889,779 | 6/1959 | Hofer.................... | 37/58 UX |
| 3,380,463 | 4/1968 | Trethewey............ | 137/4 |

FOREIGN PATENTS

| 6,501,405 | 8/1966 | Netherlands......... | 37/58 |

Primary Examiner—Robert E. Pulfrey
Assistant Examiner—Clifford D. Crowder
Attorney—Imirie, Smiley, Snyder and Butrum ABSTRACT: A pressure differential measuring device is located on board a dredging vessel. The water-filled lines transmitting to the measuring device communicate with branches of a purgative water system at points located sufficiently higher than the discharge points of the branches that the pressures at such communication points never falls below the value of the vapor pressure of the water, thus allowing the onboard placement of the measuring device.

Also, the communicating points are so located that the ratio of the branch flow pressure loss in one branch at its communicating point with respect to the branch flow pressure loss at its discharge point is equal to the ratio of these values in the other branch. In this way, the measured pressure differential is independent of the purgative pump output.

INVENTOR
ROMKE VAN DER VEEN
BY *Imirie & Smiley*
ATTORNEYS

PRESSURE DIFFERENTIAL MEASURING MEANS FOR SUCTION DREDGING INSTRUMENTS

The invention relates to a suction dredging installation, comprising a vessel, a suction pipe connected to a sand pump and a measuring device for measuring a pressure difference between a first measuring point arranged in or near the suction pipe and a second measuring point, said measuring device comprising a purgative pump, pumping water, a pressure difference pickup, a first purgative conduit ending in the first measuring point and being connected to the purgative pump, a second purgative conduit ending in the second measuring point and being connected to the purgative pump, a first tactile conduit being filled with water, ending at the place of a first tactile point in the first purgative conduit and being connected to the one side of the pressure difference pickup, and a second tactile conduit being filled with water, ending at the place of a second tactile point in the second purgative conduit and being connected to the other side of the pressure difference pickup.

With the known suction dredging installation of the above mentioned kind an electric pressure difference pickup is mounted below the water level.

The invention now provides a suction dredging installation of the above-mentioned kind which gives extra advantages, in that the pressure difference pickup is placed on board the vessel and the tactile points in the purgative conduits are so arranged at considerable distances above the measuring points, that the quotient of the resistance in the first purgative conduit into the first tactile point and the total resistance of the first purgative conduit is equal to the corresponding quotient concerning the second purgative conduit. As the pressure difference pickup is placed on board the vessel, a possible defect at the pressure difference pickup can be easily located and repaired, even during operation. Furthermore the pressure difference pickup breaks down less frequently owing to the fact, that this pickup is not arranged below the water level. The danger of short-circuiting of electric measuring conduits being submerged, is avoided according to the invention.

When the pressure difference pickup is placed on board the vessel, the problem occurs that low pressures, such as these owing to the suction working of the sand pump may occur in and round the suction pipe, cause a decrease of the pressure in the tactile conduits ending in and round the suction pipe beneath the vapor tension of water, which makes the measurements unreliable or impossible.

This problem is avoided according to the invention, in that the tactile points are arranged at considerable distances above the measuring points, where the pressure is considerably higher than at the place of the measuring points. In order to make the measurements independent on the pump pressure and the pump output, the distances of the measuring points unto the tactile points are fixed in such a way, that the quotient of the resistance in the first purgative conduit unto the first tactile point and the total resistance of the first purgative conduit is equal to the corresponding quotient concerning the second purgative conduit.

The mentioned and other features of the suction dredging installation according to the invention will be elucidated in the following description.

In the drawing schematically represent:

FIG. 1 a suction dredging installation according to the invention and

Figure 2:
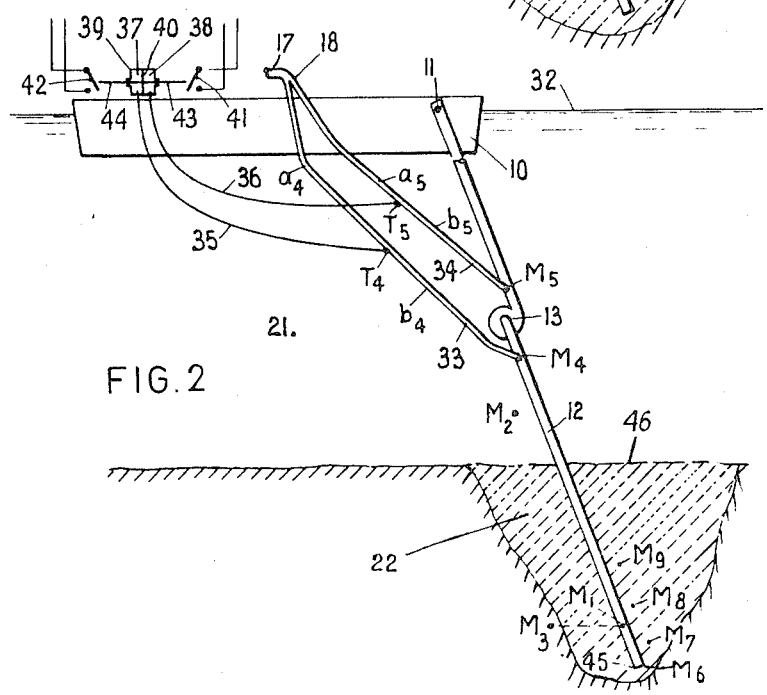

FIG. 2 the same suction dredging installation, wherein some of the parts represented in FIG. 1 are dropped and other parts are added.

The suction dredging installation of FIG. 1 comprises a vessel 10, a suction pipe 12 swingably suspended on the vessel 10 by being mounted on an axle 11 and comprises a submerged sand pump 13, incorporated in said suction pipe 12. The suction pipe 12 communicates with a sand pump 14 pumping the suspension of dredging spoil with water sucked up, away through a pressure pipe 15.

For measuring the pressure $P_{M1}$ in the suction pipe 12 at the place of measuring point $M_1$ a measuring device is provided, said device comprising a purgative pump 16 supplying outboard water as purgative water to a main conduit 17 which is branched in a branch 18 into two separate narrow purgative conduits 19 and 20, which respectively debouch at the place of the measuring point $M_1$ into the suction pipe 12 and at the place of the measuring point $M_2$ into the outboard water 21 above the level 46 of the fluidized sand 22 which is found in the breach.

First and second tactile points $T_1$ and $T_2$ respectively are arranged in the purgative conduits 20 and 21 in such a way, that:

$$\frac{a_1}{a_1+b_1} = \frac{a_2}{a_2+b_2}$$

wherein represent:

$a_1$ and $a_2$: the lengths of the purgative conduits 19 and 20 respectively between the branch 18 on the one side and the tactile points $T_1$ and $T_2$ respectively on the other and $b_1$ and $b_2$: the lengths of the purgative conduits 19 and 20 respectively between the tactile points $T_1$ and $T_2$ respectively on the one side and the measuring points $M_1$ and $M_2$ on the other.

The tactile points $T_1$ and $T_2$ are connected by means of tactile conduits 23 and 24 to the chambers 26 and 27 of a pressure difference pickup 28 at the place of the connecting points $D_1$ and $D_2$, said chambers 26 and 27 lying on both sides of a membrane 25.

The conduits 19 and 20 are of substantially uniform cross section and are devoid of any sharp curves so that the internal flow losses thereof, per unit length, are substantially constant whereby the pressure loses due to flow therethrough are in proportion to the lengths of these conduits.

As indicator 29, for example with a pointer 30 attached to the suction pipe 12 and with a graduated scale 31, indicates the position of the suction pipe 12 and with that the depth of measuring point $M_1$ below the surface 32 of the water.

When it is desired to determine the absolute pressure $P_{M1}$ in measuring $M_1$, the pressure difference $P'$ between the pressure $P_{M1}$ and the pressure $P_{M3}$, which would prevail outside the suction pipe 12 in point $M_3$ being arranged on the level of $M_1$, is measured, if only water would be present between $M_3$ and the surface 32 of the water.

It will be proved below, that the pressure difference pickup 28 picks up the value $$\frac{a_1}{a_1+b_1} \cdot P'$$

Then $$P_{M_1} = B + 0,1k \cos c + \frac{a_1+b_1}{a_1} P'$$

wherein represent:

B the barometer pressure, $k$ the distance between the measuring point $M_1$ and the axle 11, lying on the level of the surface 32 of the water, and $c$ the angle contained by the suction pipe 12 and the surface 32 of the water.

The notations of the water columns are mentioned in FIG. 1.

The pressure in measuring point $M_1$ $$P_{M1} = P_{M3} - P' = B + h_3 - P'$$
$$P_{M2} = B + h_2$$

The total decrease of pressure in the purgative conduit 19 is:

$$(P_p + B + h_o + h_1) - P_{M1} = P_p + P' + h_o$$

($P_p$ is the overpressure in the purgative conduits 19 and 20 at the place of the branch 18).

The total decrease of pressure in the purgative conduit 20 is:

$$(P_p + B + h_o + h_2) - P_{M2} = P_p + h_o$$

$$P_{T1} = (P_p + B + W_1 + h_0) - \frac{a_1}{a_1+b_1} \cdot (P_p + P' + h_0)$$

$$P_{T2} = (P_D + B + W_2 + h_0) - \frac{a_2}{a_2 + b_2} \cdot (P_D + h_0)$$

$$P_{D1} = P_{T1} - h_d - W_1$$
$$P_{D2} = P_{T2} - h_d - W_2$$

From the four last equations it follows, that the value picked up by the pressure difference pickup 28 is:

$$P_D = P_{D2} - P_{D1} = \frac{a_1}{a_1 + b_1} \cdot P'$$

From the immediately above equation, it is seen by inspection that $P_D$ is independent of the level at which the measuring points $M_1$ and $M_2$, the tactile points $T_1$ and $T_2$, the pressure difference pickup 28 and the branch 18 are arranged. Furthermore $P_D$ is independent on the pump pressure $P_p$, the output as well as the velocity of the purgative water.

Therefore the main conduit 17 can be simply connected to any given water pump, for example a gland pump, which is already provided on board.

However, the pump pressure $P_p$ should be so large, that a pressure is prevailing over the complete lengths of the purgative conduits, which is larger than the vapor tension of the purgative water. In order to reduce the output of the purgative water and yet to achieve a large decrease of pressure in the purgative conduits 19 and 20, these conduits have a flow section of for example 20 mm².

Preferably the output of the pressure difference pickup 28 is multiplied with the factor $(a_1 + b_1/a_1)$ with the aid of means not shown and is coupled with a turnable graduated scale of an indicating device, while the pointer swinging over that scale, is coupled with the output of the depth indicator 29, so that the pressure $P_{M3}$ consisting of the term B and the variable terms $h_1$ and $P'$, can be read from this indicating device.

With the suction dredging installation according to the invention measuring with the aid of a pressure difference pickup 28 placed on board and with the aid of tactile conduits 23 and 24 filled with water is possible, even when $P_{M3} - 0, 1h_1 - 0, 1h_d$ is lower than the vapor tension of the purgative water.

Measuring according to the method described above in connection with the measuring points $M_3$ and $M_2$, is particularly of great importance for the pressure $P_{M4}$ at the suction side of the submerged pump 13 (see FIG. 2), for which it is held with certainty, that during operation the pressure $P_{M4} - 0, 1h_4 - 0, 1h_d$ is lower than the vapor tension of water.

With the suction dredging installation of FIG. 1 purgative conduits 33 and 34 are also connected to the branch 18 for measuring the pressure difference over the pump 13. On these purgative conduits 33 and 34 tactile points $T_4$ and $T_5$ are arranged in such a way, for example in the middle, that $$\frac{a_4}{a_4 + b_4} = \frac{a_5}{a_5 + b_5}$$

The tactile conduits 35 and 36 connect the tactile points $T_4$ and $T_5$ with the two chambers 37 and 38 arranged on both sides of a membrane 40 fixed with its edge in the pressure difference pickup 39. The pressure difference pickup 39 which measures the pressure difference $P_{T5} - P_{T4}$, is performed as a regulating member controlling electric switches 41 and 42 by means of bars 43 and 44 connected to the membrane and sealingly guided through the casing of the pressure difference pickup 39. When exceeding and falling below a determined adjusted value of $P_{T5} - P_{T4}$, the pressure difference pickup 39 controls the switches 41 and 42 respectively, which control driving means, no shown, of the suction dredging installation, for example to lift or to pay out the suction pipe 12, to change the supply of fuel of the engines driving the pumps or to adjust another member of the suction dredging installation, influencing the sucking up process.

Besides the mentioned real measuring points $M_1$, $M_2$, $M_4$ and $M_5$ and the imaginary measuring point $M_3$, for instance also the real measuring points $M_6$ in the suction mouth 45 and the real measuring points $M_7$, $M_8$ and $M_9$ arranged above each other, in the breach 46 near the suction pipe 12, can be provided, said measuring points each being provided with a purgative conduit not shown and a tactile conduit not shown, said latter conduit being connected to a pressure difference pickup not shown. From the pressure difference $P_{M4} - P_{M8}$ and the pressure difference $P_{M8} - P_{M9}$ the concentration of sand in the breach at those measuring points can be deduced, while the pressure difference $P_{M9} - P_{M2}$ gives an indication about the level 46 of the fluidized sand 22 above the suction mouth 45. Preferably all applied pressure difference pickups are placed at each other in one and the same room on board the vessel 10. One and the same tactile conduit can be connected to a plurality of pressure difference pickups, so that for instance the pressure difference pickup 28 measures the pressure difference $P_{M2} - P_{M1}$ and another pressure difference pickup the pressure difference $P_{M9} - P_{M2}$.

It is also possible to connect one and the same pressure difference pickup, with the aid of valves, not shown, in turn to different pairs of tactile conduits, so that one pressure difference pickup is enough to measure a plurality of pressure differences.

The purgative conduits and tactile conduits preferably consist of tubes of synthetic material. The parts of these tubes extending below the water level are connected to the suction pipe 12.

What I claim is:

1. In a dredging system of the type including a vessel at the surface of a body of water; a suction dredging assembly carried by said vessel and including suction pump means having an inlet conduit projecting downwardly into a body of sand located below the surface of the water and a discharge conduit for directing a suspension of sand in water to a sand recovery region; and pressure-measuring means comprising purgative pump means having an inlet for water and a pressurized water outlet having at least two branches, one branch discharging at a first discharge point located below the surface of the water such that the pressure at said first discharge point is influenced by the suction pressure in said inlet conduit of the suction pump means, and the other branch discharging at a second discharge point located at a level different from said first discharge point, and pressure difference pickup means having a first water-filled line communicating with said one branch at a first pressure pickup point and a second water-filled line communicating with said other branch at a second pressure pickup point; the improvement wherein:

said pressure difference pickup means is located on board said vessel and said first and second water-filled lines communicate respectively with said one and said other branches at levels sufficiently higher than the levels of said first and said second discharge points that the pressures at said first and second pressure pickup points remain always at values greater than the vapor pressure of water, and the ratio of (1) the value of pressure decrease at said first pickup point due to flow losses in said one branch to such first pickup point to (2) the value of pressure decrease at said first discharge point due to flow losses in said one branch to such first discharge point being equal to the ratio of (3) the value of pressure decrease at said pickup point due to flow losses in said other branch to such second pickup point to (4) the value of pressure decrease at said second discharge point due to flow losses in said other branch to such second discharge point, whereby the pressure difference measured by said pickup means is independent of the output of said purgative pump means.

2. In the dredging system as defined in claim 1 wherein said first discharge point is located below the level of the interface between the body of water and the body of sand and said second discharge point is located above such interface.

3. In the dredging system as defined in claim 2 wherein said one branch discharges into said inlet conduit at said first discharge point.

4. In the dredging system as defined in claim 1 wherein said one branch discharges into said inlet conduit and said second branch discharges into said discharge conduit.